Patented Mar. 30, 1943

2,315,384

UNITED STATES PATENT OFFICE 2,315,384

METHOD FOR REMOVING WEAKLY ACIDIC ORGANIC SUBSTANCES FROM HYDROCARBON LIQUIDS

George W. Ayers, Jr., Chicago, Donald C. Bond, Northbrook, and Lawrence M. Henderson, Winnetka, Ill., assignors to The Pure Oil Company, Chicago, Ill., a corporation of Ohio No Drawing. Application May 9, 1941, Serial No. 392,750

8 Claims. (Cl. 196—32)

This invention relates to a method and reagent for removing weakly acidic substances from water-immiscible liquids, and more particularly to method and reagent for removal of mercaptans and other acidic organic compounds from hydrocarbon oil.

It is common practice in the petroleum refining industry to treat petroleum distillates, particularly cracked distillates, with alkali solutions in order to remove acidic organic sulfur compounds such as mercaptans.

It is also known that the efficacy of alkaline-reacting solutions in removing mercaptans from hydrocarbon liquids can be materially improved by adding to such solutions various compounds such as alkali salts of the lower molecular weight members of the fatty acid series, for example, sodium or potassium isobutyrate.

It has been found that the ability of alkali solutions to remove acidic bodies from water-immiscible liquids can be enhanced by dissolving therein suitable quantities of gum copal. The solubility of copal or the alkali metal hydroxide reaction product thereof, which is the form in which copal exists in aqueous alkali solutions, in aqueous alkali solutions is very low and since substantial concentrations are necessary in order to substantially enhance the mercaptan-extracting power of the aqueous alkali solution, it is necessary to increase the solubility of the copal by the use of a solventizer therefor; i. e. a substance which will enable larger quantities of the copal to dissolve in the alkali solution. By "copal" it is intended to include the various grades of copal that are commercially available, such as Zanzibar, Dutch East Indies, Congo, Manila and Pontianak. These copals differ somewhat in composition such as in the amount and type of organic acids present. Ordinarily, Zanzibar copal contains about 80% of trachylolic acid and about 4% of iso-trachylolic acid, while Congo copal contains about 50% of Congo copolic acid and about 22% of Congo copalolic acid. Other grades of copal may vary as to the amount of these acids or of other organic acids present. In any event, and irrespective of the exact composition, copal to be satisfactory in accordance with the terms of this invention should be alkali soluble; that is, soluble to the extent of at least 5% by weight in an aqueous sodium hydroxide solution containing 5% free sodium hydroxide and 20% by weight of commercial cresol. "Free" sodium hydroxide is intended to define that amount of sodium hydroxide over and above the sodium hydroxide required for combination with the copal and solventizer.

Strong aqueous alkali solutions will dissolve only relatively small quantities of copal or the alkali metal salt thereof and in the quantities that the copal is dissolved in the aqueous alkali, it has no material effect insofar as enhancing the ability of the alkali solution to remove acidic substances such as mercaptans from hydrocarbon oils. However, when a material is added to alkali solution which has the ability to increase the solubility of the copal and a sufficient amount of copal is added to the alkali solution, the resultant reagent is very effective for removing acidic bodies such as mercaptans from petroleum oils.

It is, of course, possible to use caustic alkali solutions of low concentration since these solutions will dissolve larger amounts of copal, but in low concentration, caustic alkali solution per se or saturated with copal is relatively ineffective in removing mercaptans from petroleum oils. If an attempt is made to increase the concentration of the alkali to a point where it is effective in removing mercaptans, the copal salt precipitates from the solution. It is therefore essential that a solventizer for the copal be employed.

A number of different phenolic compounds such as phenols and alkyl phenols, for example, phenol, xylenols, o-, m-, and p-cresol and alpha naphthol, as well as thio-phenolic compounds such as thiophenols and thiocresols, as well as glycols such as ethylene glycol, are suitable solventizers since they are soluble in aqueous alkali metal hydroxide solutions and since they are capable of materially increasing the amount of copal which may be dissolved in the alkali metal hydroxide solutions. In order to be a satisfactory solventizer it is preferred that the material be soluble in the alkali metal hydroxide solution to an extent of at least 5% by weight of the solution.

A large number of tests were carried out using ordinary commercial Dutch East Indies copal obtained from A. Daigger & Company. This copal had an acid number of 125 as determined by titration in 50% aqueous alcohol solution with standard potassium hydroxide using phenolphthalein as an indicator. Numerous mixtures were prepared containing various proportions of water, sodium hydroxide, copal and cresol. The cresol used was a commercial grade of 5 degree meta-para cresol obtained from the Barrett Company. The components of each of the various mixtures were thoroughly mixed, heated on a water bath for 30 minutes with occasional shaking and were then allowed to stand for at least six hours at room temperature prior to use. Those mixtures in which the components were completely dissolved were used in treating samples of cracked gasoline. All of the samples of gasoline were obtained from commercial combination high pressure cracking units. In all cases the amount of treating solution used was 7% by volume of the gasoline sample treated. The treating solution and gasoline were contacted by shaking vigorously for 5 minutes in a closed container in an atmosphere of nitrogen, the treated gasoline separated and mercaptan sulfur analyses made. From the results of these analyses the percentage of mercaptan sulfur removed from the gasoline by each solution was calculated. The results of these tests are shown in the following table.

the gasoline. When the concentrations of free sodium hydroxide, cresol and copal were increased to 21.7%, 20% and 10%, respectively, as shown in example 22, the mercaptan extracting efficiency was increased to 86%, although this treating solution was more viscous than is ordinarily desired for use in certain types of treating apparatus where the contact between the gasoline and treating reagent may be violent and resultant emulsion difficulties encountered. It is further seen from the data in the table, that when the free alkali content of the treating reagents was increased to about 27 to 31%, it was not possible to prepare stable homogeneous solutions, although the concentration of copal was reduced to as little as 5% and although as much as 20% cresol solventizer was used therewith.

Usually sodium hydroxide solutions are employed because of their lower cost although po-

Table

| Example Number | Treating solution | | | | Remarks | Gasoline | |
|---|---|---|---|---|---|---|---|
| | Total per cent NaOH | Per cent NaOH, free | Per cent cresol | Per cent gum copal | | Per cent RSH—S in untreated gasoline | Per cent removal of mercaptan sulfur |
| 1 | 5 | 5 | 0 | 0 | | 0.0226 | 44 |
| 2 | 10 | 10 | 0 | 0 | | 0.0226 | 44 |
| 3 | 15 | 15 | 0 | 0 | | 0.0248 | 46 |
| 4 | 20 | 20 | 0 | 0 | | 0.0236 | 48 |
| 5 | 25 | 25 | 0 | 0 | | 0.0247 | 49 |
| 6 | 15 | 14.1 | 0 | 10 | Insoluble | | |
| 7 | 15 | 10.4 | 10 | 10 | | 0.0247 | 62 |
| 8 | 15 | 11.3 | 10 | 0 | | 0.0247 | 51 |
| 9 | 15 | 7.6 | 20 | 0 | | 0.0243 | 51 |
| 10 | 15 | 5.8 | 20 | 20 | | 0.0247 | 59 |
| 11 | 15 | 2.1 | 30 | 20 | Solidifies on standing | | |
| 12 | 15 | None | 40 | 20 | ...do | | |
| 13 | 15 | 6.7 | 20 | 10 | | 0.0226 | 55 |
| 14 | 20 | 11.7 | 20 | 10 | | 0.0226 | 70 |
| 15 | 20 | 11.3 | 20 | 15 | | 0.0236 | 75 |
| 16 | 20 | 10.8 | 20 | 20 | | 0.0236 | 75 |
| 17 | 20 | 10.3 | 20 | 25 | Viscous solution | 0.0236 | 78 |
| 18 | 20 | 7.1 | 30 | 20 | Viscous, bad emulsion with gas | | |
| 19 | 25 | 16.7 | 20 | 10 | | 0.0226 | 79 |
| 20 | 25 | 15.8 | 20 | 20 | Viscous solution | 0.0236 | 84 |
| 21 | 30 | 22.1 | 20 | 5 | | 0.0226 | 83 |
| 22 | 30 | 21.7 | 20 | 10 | ...do | 0.0236 | 86 |
| 23 | 30 | 21.4 | 20 | 20 | Insoluble | | |
| 24 | 35 | 30.8 | 10 | 5 | ...do | | |
| 25 | 35 | 27.1 | 20 | 5 | Solidifies on standing | 0.0236 | 90 |
| 26 | 35 | 30.4 | 10 | 10 | Insoluble | | |
| 27 | 35 | 26.7 | 20 | 10 | ...do | | |

In the foregoing table the sodium hydroxide, copal and cresol content of the various aqueous sodium hydroxide treating reagents are shown in percent by weight, together with data which clearly demonstrates the extraction efficiency of the reagents. No effort was made to treat samples of gasoline with those reagents in which insoluble material was noted, since the insoluble material would probably dissolve in the gasoline with detrimental effect and since in these cases the exact amount of copal actually dissolved in such mixtures was not determined.

It will be seen from the results shown in the table, example 6, that 10% of copal was insoluble in a solution containing 14.1% free sodium hydroxide. In fact only about 1% of the copal dissolved. However, when 10% cresol was added, as in example 7, the gum copal was entirely soluble and showed a removal of 62% of the mercaptan sulfur present in a sample of gasoline when employed in accordance with the procedure previously outlined. This is greatly superior in mercaptan-extracting efficiency to example 2, which contains approximately the same amount of free sodium hydroxide. In example 2 only 44% of the mercaptan sulfur was removed from tassium hydroxide solutions because of their ability to dissolve somewhat higher concentrations of copal and solventizer, may at times be preferred. In general, very effective solutions have been found to have compositions within the following approximate limits of concentration: free alkali metal hydroxide 5% to 22% by weight; cresol 5% to 25% by weight, copal 5% to 25% by weight. It is apparent, of course, that it is only desirable to use those mixtures of alkali metal hydroxide, copal and solventizer which form homogeneous stable solutions. Those solutions which gel or solidify on standing are in general not considered satisfactory since serious mechanical difficulties might be encountered when such solutions are employed in commercial operation. A further characteristic which must be taken into consideration is the viscosity of the treating reagent, since this has a direct bearing on the ease with which such solutions separate from the immiscible liquids with which they are contacted. For this reason, highly viscous solutions, even though they are stable, are generally less desirable as treating reagents. Solutions which are about 90% saturated with respect to the dissolved alkali metal hydroxide, copal and solventizer are particularly effective.

It will be apparent that in preparing treating reagents in accordance with this invention, the copal and solventizers may be added as such or as the alkali metal salts thereof, since both the copal and solventizer form alkali metal salts when dissolved in aqueous alkali metal hydroxide solutions.

The specific examples given are only by way of illustration and are not intended to limit the invention to the specific quantities or to the particular compounds named. Mixtures of various solventizers may be used as well as individual compounds. While sodium hydroxide was used in all the examples shown, reagents employing potassium hydroxide are even more effective in mercaptan-extracting efficiency, although the cost of the reagent when using potassium hydroxide is not as low as when using sodium hydroxide.

What is claimed is:

1. In a method for removing acidic organic substances from otherwise neutral organic water-immiscible fluids, the step which comprises contacting said fluids with aqueous alkali solution containing copal in the form of its reaction product with alkali metal hydroxide and solventizer therefor.

2. In a method for removing weakly acidic substances from hydrocarbon fluids, the step which comprises contacting said fluids with stable homogeneous aqueous solution containing not less than about 5% by weight of free alkali metal hydroxide, not less than about 5% by weight of copal in the form of its reaction product with alkali metal hydroxide and sufficient solventizer to maintain the copal in solution.

3. Method in accordance with claim 2 in which the solventizer is a phenolic compound.

4. In a method for removing weakly acidic organic substances from hydrocarbon liquids, the step which comprises contacting said liquids with stable homogeneous aqueous solution containing not less than approximately the indicated amounts by weight of the following materials: alkali metal hydroxide, free, 5%; copal in the form of its reaction product with alkali metal hydroxide, 5%; solventizer, 5%.

5. Method in accordance with claim 4 in which the solventizer is a phenolic compound.

6. Method in accordance with claim 4 in which the solventizer is a cresol.

7. In a method for removing weakly acidic organic substances from hydrocarbon liquids, the step which comprises contacting said liquids with aqueous solution containing approximately the indicated amounts by weight of the following materials: sodium hydroxide, free, 5 to 22%; copal in the form of its reaction product with alkali metal hydroxide, 5 to 25%; phenolic compound, 5 to 25%.

8. Method in accordance with claim 7 in which the solventizer is a cresol.

GEORGE W. AYERS, Jr.
DONALD C. BOND.
LAWRENCE M. HENDERSON.